United States Patent
Oh et al.

(10) Patent No.: US 9,218,082 B2
(45) Date of Patent: Dec. 22, 2015

(54) LIQUID CRYSTAL DISPLAY DEVICE WITH A BUILT-IN TOUCH SCREEN AND METHOD FOR MANUFACTURING THE SAME

(75) Inventors: Kum Mi Oh, Seoul (KR); Han Seok Lee, Seoul (KR); Won Keun Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 740 days.

(21) Appl. No.: 13/198,149

(22) Filed: Aug. 4, 2011

(65) Prior Publication Data

US 2012/0068944 A1 Mar. 22, 2012

(30) Foreign Application Priority Data

Sep. 20, 2010 (KR) ........................ 10-2010-0092385

(51) Int. Cl.
*G06F 3/041* (2006.01)
*G02F 1/1333* (2006.01)
*G06F 3/044* (2006.01)
*G02F 1/1362* (2006.01)

(52) U.S. Cl.
CPC .......... *G06F 3/0412* (2013.01); *G02F 1/13338* (2013.01); *G06F 3/044* (2013.01); *G02F 1/136227* (2013.01); *G02F 2001/13629* (2013.01); *G02F 2001/136231* (2013.01); *G02F 2001/136236* (2013.01); *G02F 2001/136295* (2013.01)

(58) Field of Classification Search
CPC .................................... G09G 3/36; H01J 9/00
USPC ........................................................ 345/173
See application file for complete search history.

(56) References Cited

U.S. PATENT DOCUMENTS

| 7,999,264 | B2 * | 8/2011 | Cho et al. | ............ H01L 27/1248 257/72 |
| 8,345,173 | B2 * | 1/2013 | Cho | ................................. 349/12 |
| 2005/0179668 | A1 * | 8/2005 | Edwards | ....................... 345/173 |
| 2006/0214168 | A1 * | 9/2006 | Akimoto et al. | ................. 257/59 |
| 2007/0268243 | A1 * | 11/2007 | Choo et al. | .............. G06F 3/044 345/104 |
| 2009/0290083 | A1 * | 11/2009 | Lim et al. | ......................... 349/46 |
| 2010/0193257 | A1 | 8/2010 | Hotelling et al. | |
| 2010/0194697 | A1 * | 8/2010 | Hotelling et al. | ...... G06F 3/0412 345/173 |

FOREIGN PATENT DOCUMENTS

EP 2214084 A1 8/2010

OTHER PUBLICATIONS

EP Search Report dated Dec. 16, 2011 in related EP Application No. 11 00 7619.

* cited by examiner

*Primary Examiner* — Gregory J Tryder
*Assistant Examiner* — James M Holland
(74) *Attorney, Agent, or Firm* — Morgan, Lewis & Bockius LLP

(57) ABSTRACT

A liquid crystal display device with a built-in touch screen with improved contact efficiency between the data electrode and the pixel electrode on the lower substrate, and a method for manufacturing such a device with reduced cost and excellent efficiency by making use of a half-tone mask are disclosed.

9 Claims, 13 Drawing Sheets

| Mask | Layer |
|---|---|
| 1 | Light shield |
| 2 | Active |
| 3 | Gate |
| 4 | ILD & contact |
| 5 | Data (S/D) |
| 6 | PAS0, PAS1 |
| 7 | Vcom |
| 8 | 3rd Metal |
| 9 | PAS2 |
| 10 | Pixel ITO |

FIG.5

| Mask | Layer |
|---|---|
| 1 | Light shield |
| 2 | Active |
| 3 | Gate |
| 4 | ILD & contact |
| 5 | Data line(S/D) |
| 6 | PAS1 |
| 7 | Vcom |
| 8 | 3rd Metal |
| 9 | PAS2 & Pixel ITO |

| Mask | Layer |
|---|---|
| 1 | Active |
| 2 | Gate |
| 3 | ILD & contact |
| 4 | Data line(S/D) |
| 5 | PAS1 |
| 6 | Vcom & 3rd Metal |
| 7 | PAS2 & Pixel ITO |

(a)

(b)

LIQUID CRYSTAL DISPLAY DEVICE WITH A BUILT-IN TOUCH SCREEN AND METHOD FOR MANUFACTURING THE SAME

CROSS REFERENCE TO RELATED APPLICATIONS

This application claims the benefit of the Korean Patent Application No. 10-2010-0092385 filed on Sep. 20, 2010, which is hereby incorporated by reference as if fully set forth herein.

BACKGROUND OF THE INVENTION

1. Field of the Invention

The present invention relates to a flat panel display device, and more particularly, a liquid crystal display device with a built-in touch screen, which improves driving efficiency and reduces manufacturing costs by having a simplified manufacturing process, and a method for manufacturing the same.

2. Discussion of the Related Art

With the developments in various mobile electronic equipment such as mobile terminals and notebook computers, there is an increasing demand for an applicable flat panel display device.

The flat panel display device may include a liquid crystal display device (LCD), a plasma display panel (PDP), a field emission display device (FED), a light-emitting diode display device (LED), etc.

Among the various flat panel display devices, the LCD device is widely used owing to various advantages, for example, technical development of mass production, ease of driving means, low power consumption, high-quality resolution, and large-sized screen.

Related art use a mouse or keyboard as an input device of the flat panel display device. Recently, a touch screen is used as a new input device for the flat panel display device, wherein the touch screen enables a user to directly input information by the use of finger or pen.

The touch screen has been widely applied in various fields, for example, mobile terminals such as navigation, terminal for industrial use, notebook computer, automatic teller machine (ATM), mobile phone, MP3, PDA, PMP, PSP, mobile game machine, DMB receiver, and tablet PC; and electric appliances such as refrigerator, microwave oven, and washing machine. Furthermore, easy operation of the touch screen rapidly enlarges the application field.

Research and development has occurred to produce a slim flat panel display device, with an LCD device having a built-in touch screen. Especially, an in-cell touch type LCD device has been most actively researched and developed, wherein the in-cell touch type LCD device refers to an LCD device which uses an element existing in the related art structure, for example, a common electrode on a lower substrate, as a touch-sensing electrode.

FIG. 1 illustrates an LCD device with a built-in touch screen according to the related art, and a method for driving the same.

Referring to FIG. 1, the LCD device with a built-in touch screen according to the related art comprises lower and upper substrates 50 and 60 bonded to each other with a liquid crystal layer (not shown) interposed therebetween.

On the upper substrate 60, there are a black matrix 62; red, green, and blue color filters 64R, 64G, and 64B; and an overcoat layer 66. In this case, the black matrix 62 defines a pixel region corresponding to each of plural pixels. Also, the red, green, and blue color filters 64R, 64G, and 64B are respectively formed in the respective pixel regions defined by the black matrix 62. The overcoat layer 66 covers the red, green, and blue color filters 64R, 64G, and 64B and the black matrix 62, to thereby planarize the upper substrate 60.

On the lower substrate 50, there is a pixel array 40 including plural pixels (not shown) to drive the liquid crystal layer and detect a touching point by finger or pen.

Each of the plural pixels is defined by gate and data lines crossing each other. At the crossing portion of the gate and data lines, there is a thin film transistor (hereinafter, referred to as 'TFT'). Each of the plural pixels includes a common electrode and a pixel electrode.

FIG. 2 is a cross section view illustrating a lower substrate in the LCD device with a built-in touch screen according to the related art. FIG. 2 shows a lower substrate in a fringe field switch (FFS) mode.

Referring to FIG. 2, each pixel of the lower substrate 50 is formed on a glass substrate. In each pixel, there are a light-shielding layer 71 for preventing incident light; a buffer layer 51 on the light-shielding layer 71; an active layer (semiconductor layer) 72 on the buffer layer 51; a gate insulating layer 52 on the active layer 72; a gate electrode 73 of a metal material on the gate insulating layer 52, wherein the gate electrode 73 is partially overlapped with the active layer 72; an interlayer dielectric (ILD) 53 for insulating the gate electrode 73 from a data electrode (source or drain electrode) 74; and the data electrode 74 electrically connected with the active layer 72.

At this time, the data electrode 74 is formed by burying a metal material in a first contact hole to expose a predetermined portion of the active layer 72. The data electrode 74 is electrically connected with a pixel electrode (pixel ITO) 77 to be described.

In each pixel of the lower substrate 50, there are a first passivation layer (PAS0) 54, a second passivation layer (PAS1) 55, a common electrode 75, a conductive line ($3^{rd}$ metal) 76, a third passivation layer (PAS2) 56, and the pixel electrode 77, which are sequentially formed on the interlayer dielectric 53. The first and second passivation layers (PAS0, PAS1) 54 and 55 are formed to cover the gate electrode 71 and the data electrode 74. The common electrode 75 is formed on the second passivation layer 55, wherein the common electrode 75 is formed of a transparent conductive material such as Indium-Tin-Oxide (ITO). The conductive line 76 is formed on a predetermined portion of the common electrode 75. The third passivation layer 56 is formed to cover the common electrode 75 and the conductive line 76. The pixel electrode 77 is electrically connected with an upper portion of the third passivation layer 56 and the data electrode 74, wherein the pixel electrode 77 is formed of a transparent conductive material.

A second contact hole is formed by partially etching the first, second, and third passivation layers (PAS0, PAS1, and PAS2) 54, 55, and 56. Through the second contact hole, the upper portion of the data electrode 74 is exposed.

In this case, a predetermined portion of the second passivation layer (PAS1) 55, which is formed on the first passivation layer (PAS0) 54, is etched first, and then predetermined portions of the first and third passivation layers (PAS0, PAS2) 54 and 56 are etched at the same time, to thereby expose the upper portion of the gate electrode 74.

The pixel electrode 77 is formed inside the contact hole formed by etching the first, second, and third passivation layers (PAS0, PAS1, and PAS2) 54, 55 and 56. Thus, the pixel electrode 77 is electrically connected with the data electrode 74.

In the related art structure, the open region of the second contact hole for the electric connection between the data electrode 74 and the pixel electrode 77 is determined depending on the etching of the second passivation layer (PAS1) 55. Accordingly, the exposed region of the data electrode 74 is reduced so that a contact region between the data electrode 74 and the pixel electrode 77 is also reduced, to thereby deteriorate contact efficiency.

During photolithography for etching the third passivation layer 56 after the second passivation layer 55, there might be an alignment failure and a contact failure by foreign matters.

In the LCD device with a built-in touch screen according to the related art having the above structure, an image depending on a video signal is displayed by controlling transmittance of light passing through the liquid crystal layer of each pixel for a display period of a frame. For a non-display period of a frame, the common electrode 75 is driven as a touch-sensing electrode, thereby sensing a capacitance (Ctc) based on a user's touch, and detecting a touch point (TS) through the sensed capacitance.

The LCD device with a built-in touch screen according to the related art is formed in such a way that the common electrode 75 is arranged in each individual pixel, and the neighboring common electrodes 75 are electrically connected by the use of conductive line 76.

Accordingly, the process of forming the common electrode 75 is separately carried out from the process of forming the conductive line 76, whereby the manufacturing cost is increased and the yield is deteriorated due to the complicated manufacturing process.

Amorphous silicon (a-Si) TFT has disadvantages of low driving speed, and limitation in design of fine line width. In order to overcome these disadvantages, the elements of the lower substrate 505 (for example, TFT) may be formed of low-temperature poly silicon (LTPS).

If the elements of the lower substrate 505 (for example, TFT) are formed of low-temperature poly silicon (LTPS), as shown in FIG. 3, the method inevitably uses 10 masks. Also, plural detailed processes (for example, 155 steps) are carried out by using 10 masks.

The respective processes for forming the common electrode 75 and the conductive line 76 uses additional masks ('mask 7' is used for formation of the common electrode, and 'mask 8' is used for formation of the conductive line), whereby plural detailed processes are carried out.

As mentioned above, the low-temperature amorphous silicon (LTPS) facilitates high resolution as compared to the amorphous silicon (a-Si), and also facilitates good TFT-operation properties. However, in comparison to the case of using the amorphous silicon (a-Si), the increased number of mask processes causes the complicated manufacturing process, to thereby deteriorate price competition and efficiency.

SUMMARY OF THE INVENTION

Accordingly, the present invention is directed to an LCD device with a built-in touch screen and a method for manufacturing the same that substantially obviates one or more problems due to limitations and disadvantages of the related art.

An aspect of the present invention is to provide an LCD device with a built-in touch screen, which enhances driving efficiency by using a lower substrate of low-temperature poly silicon (LTPS), and a method for manufacturing the same.

Another aspect of the present invention is to provide an LCD device with a built-in touch screen, which reduces manufacturing costs by reducing the number of masks for a process of forming a lower substrate, and a method for manufacturing the same.

Another aspect of the present invention is to provide an LCD device with a built-in touch screen, which enhances manufacturing efficiency by simplifying a manufacturing process of a lower substrate, and a method for manufacturing the same.

Another aspect of the present invention is to provide an LCD device with a built-in touch screen, which enhances contact efficiency by increasing a contact between a data electrode and a pixel electrode on a lower substrate, and a method for manufacturing the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device with a built-in touch screen comprising a substrate having a pixel region, a thin film transistor in the pixel region, a first passivation layer on the thin film transistor, the first passivation layer including a first contact hole, a common electrode on at least one portion of the first passivation layer, the common electrode formed of a first material and operable to sense touch, a first conductive layer inside the first contact hole so as to be electrically connected to a data electrode of the thin film transistor, a conductive line on at least one portion of the first passivation layer and electrically connected to the common electrode, the conductive line formed of a second material, a second conductive layer on the first conductive layer, a second passivation layer on the common electrode, the first passivation layer, and the conductive line, the second passivation layer including a second contact hole, and a pixel electrode on the second passivation layer, the pixel electrode being electrically connected to the second conductive layer through the second contact hole such that the pixel electrode is electrically connected to the data electrode via the first and second conductive layers.

In yet another aspect of the present invention, there is provided a method for manufacturing a liquid crystal display device with a built-in touch screen comprising the steps of forming a substrate having a pixel region, forming a thin film transistor in the pixel region, forming a first passivation layer on the thin film transistor, forming a first contact hole through a portion of the first passivation layer to expose a data electrode of the thin film transistor, depositing and patterning a first conductive material thereby forming a common electrode on at least one portion of the first passivation layer and a first conductive layer inside the first contact hole, the common electrode operable to sense touch, depositing and patterning a second conductive material thereby forming a conductive line on at least one portion of the first passivation layer and a second conductive layer on the first conductive layer, forming a second passivation layer on the common electrode, the first passivation layer, the second conductive layer, and the conductive line, forming a second contact hole through a portion of the second passivation layer to expose the second conductive layer, and forming a pixel electrode electrically connected with the second conductive layer, the pixel electrode being on the second passivation layer and inside the second contact hole, wherein the second passivation layer and the pixel electrode are simultaneously formed by a single mask process using a half-tone mask.

In yet another aspect of the present invention, there is provided a method for manufacturing an LCD device with a built-in touch screen comprising the steps of forming a thin film transistor in each pixel region of a substrate, forming a first contact hole to expose a data electrode by forming a first passivation layer on the thin film transistor and partially etching the first passivation layer, depositing and patterning a first conductive material thereby forming a common electrode on the first passivation layer and a first conductive layer inside the first contact hole, and depositing and patterning a second conductive material thereby forming a conductive line electrically connected with the common electrode and a second conductive layer electrically connected with the first conductive layer, forming a second contact hole to expose the second conductive layer by forming a second passivation layer on the common electrode, the first passivation layer, the second conductive layer, and the conductive line and partially etching the second passivation layer, and forming a pixel electrode on the second passivation layer and inside the second contact hole, the pixel electrode electrically connected with the second conductive layer, wherein the second passivation layer, the second contact hole, and the pixel electrode are simultaneously formed by photolithography, etching, and ashing processes using a mask.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a method for manufacturing an LCD device with a built-in touch screen according to the first embodiment of the present invention;

DETAILED DESCRIPTION OF THE INVENTION

Figure 1:
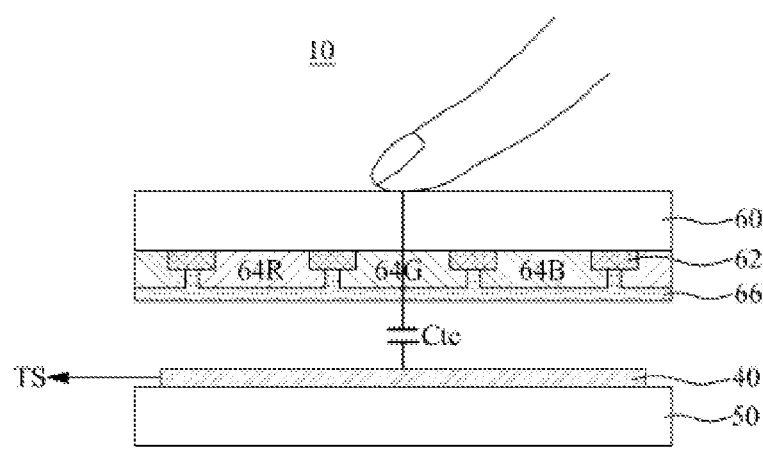
FIG. 1 illustrates an LCD device with a built-in touch screen according to the related art, and a method for manufacturing the same.
Figure 2:
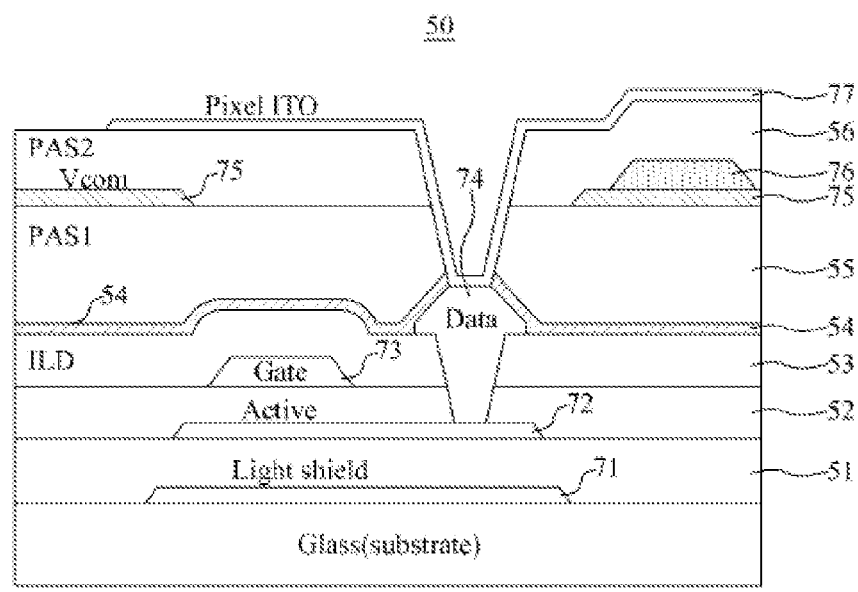
FIG. 2 is a cross section view illustrating a lower substrate in an LCD device with a built-in touch screen according to the related art.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device with a built-in touch screen according to the present invention and a method for manufacturing the same will be described with reference to the accompanying drawings.

For the following description of the embodiments of the present invention, if a first structure (for example, electrode, line, layer, contact, and etc.) is described as being formed "on" or "under" a second structure, the first and second structures may come in contact with each other, or there may be a third structure interposed between the first and second structures.

Depending on an alignment mode of liquid crystal layer, an LCD device may be classified into Twisted-Nematic (TN) mode, Vertical-Alignment (VA) mode, In-Plane Switching (IPS) mode, and Fringe Field Switching (FFS) mode.

In case of the IPS mode and the FFS mode, both a pixel electrode and a common electrode are formed on a lower substrate, whereby liquid crystal molecules of the liquid crystal layer are aligned depending on an electric field between the pixel electrode and the common electrode.

The IPS mode, the pixel electrode and the common electrode are alternately arranged in parallel so that an In-Plane mode electric field occurs between the pixel electrode and the common electrode, thereby aligning the liquid crystal molecules of the liquid crystal layer. However, with the IPS mode, the liquid crystal molecules are not properly aligned above the pixel electrode and the common electrode, whereby light transmittance is relatively deteriorated above the pixel electrode and the common electrode.

In order to overcome this problem of the IPS mode, the FFS mode has been proposed. In the FFS mode, an insulating layer is interposed between the pixel electrode and the common electrode, whereby the pixel electrode is formed at a predetermined interval from the common electrode by the interposed insulating layer.

In this case, any one of the pixel electrode and the common electrode is formed in a plate shape or pattern, and the other is formed in a finger shape, whereby a fringe field occurs between the pixel electrode and the common electrode. Thus, the liquid crystal molecules of the liquid crystal layer are aligned by the fringe field occurring between the pixel electrode and the common electrode.

The LCD device with a built-in touch screen according to the embodiment of the present invention is formed in the FFS mode.

The LCD device with a built-in touch screen according to the embodiment of the present invention comprises an in-cell touch type liquid crystal panel with a built-in touch screen for detection of a user's touch point; a backlight unit for supplying light to the liquid crystal panel; and a driving circuit.

The driving circuit includes a timing controller (T-con), a data driver (D-IC), a gate driver (G-IC), a touch-sensing driver, a backlight driver, and a power supplier.

The driving circuit may be totally or partially formed in Chip-On-Glass (COG) or Chip-On-Film (COF, Chip On Flexible Printed Circuit).

The liquid crystal panel includes lower and upper substrates bonded to each other with the liquid crystal layer interposed therebetween. Also, plural pixels (Clc, liquid crystal cells) arranged in a matrix configuration are formed in the liquid crystal panel.

The liquid crystal panel controls the transmittance of light passing through the liquid crystal layer in each pixel depending on a data voltage, to thereby display an image according to a video signal. Also, the common electrode on the lower substrate may be driven as the touch-sensing electrode to sense the change of capacitance depending on the user's touch, whereby the user's touch point can be detected through the capacitance sensed by the common electrode.

On the upper substrate, there are a black matrix (BM); red, green, and blue color filters; and an overcoat layer. The black matrix defines a pixel region corresponding to each of plural pixels. Also, the red, green, and blue color filters are respectively formed in the respective pixel regions defined by the black matrix. The overcoat layer covers the red, green, and blue color filters and the black matrix, to thereby planarize the upper substrate.

On the lower substrate, there is a pixel array including plural pixels to drive the liquid crystal layer and detect the touching point by sensing the capacitance depending on the user's touch.

The pixel array includes a thin film transistor (TFT); the pixel electrode; the common electrode; and a conductive line ($3^{rd}$ metal) for connection of the common electrodes in the respective pixels.

The lower and upper substrates are bonded to each other by the use of sealant. Also, a display region (active region) of the liquid crystal panel is shielded by the sealant.

The TFT includes a gate electrode, an active layer (semiconductor layer), an insulating layer, and a data electrode (source/drain electrode).

The TFT may be formed in a bottom gate structure where the gate electrode is positioned below the active layer. Selectively, the TFT may be formed in a top gate structure where the gate electrode is positioned above the active layer.

In the LCD device with a built-in touch screen according to the embodiment of the present invention, the lower substrate may be formed of low-temperature poly silicon (LTPS).

Figures 3, 4:
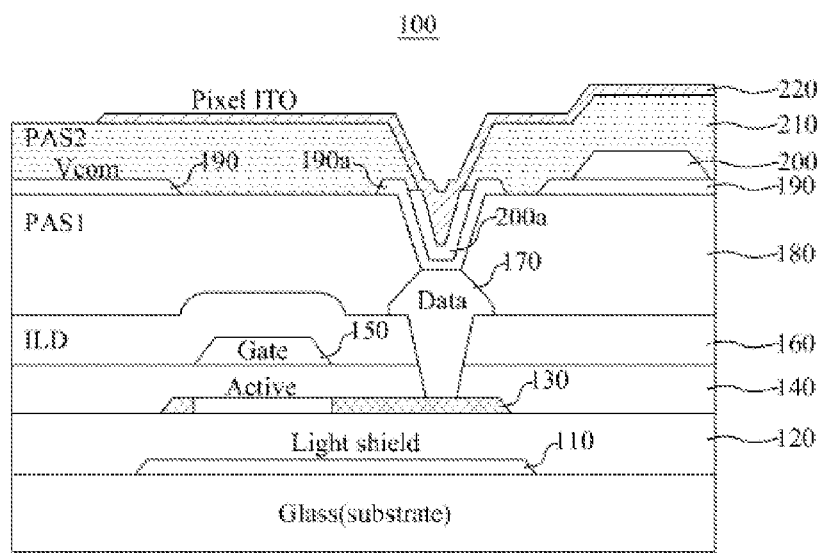
FIG. 3 illustrates a method for manufacturing an LCD device with a built-in touch screen according to the related art.
FIG. 4 illustrates a lower substrate in an LCD device with a built-in touch screen according to the first embodiment of the present invention.
Figure 6:
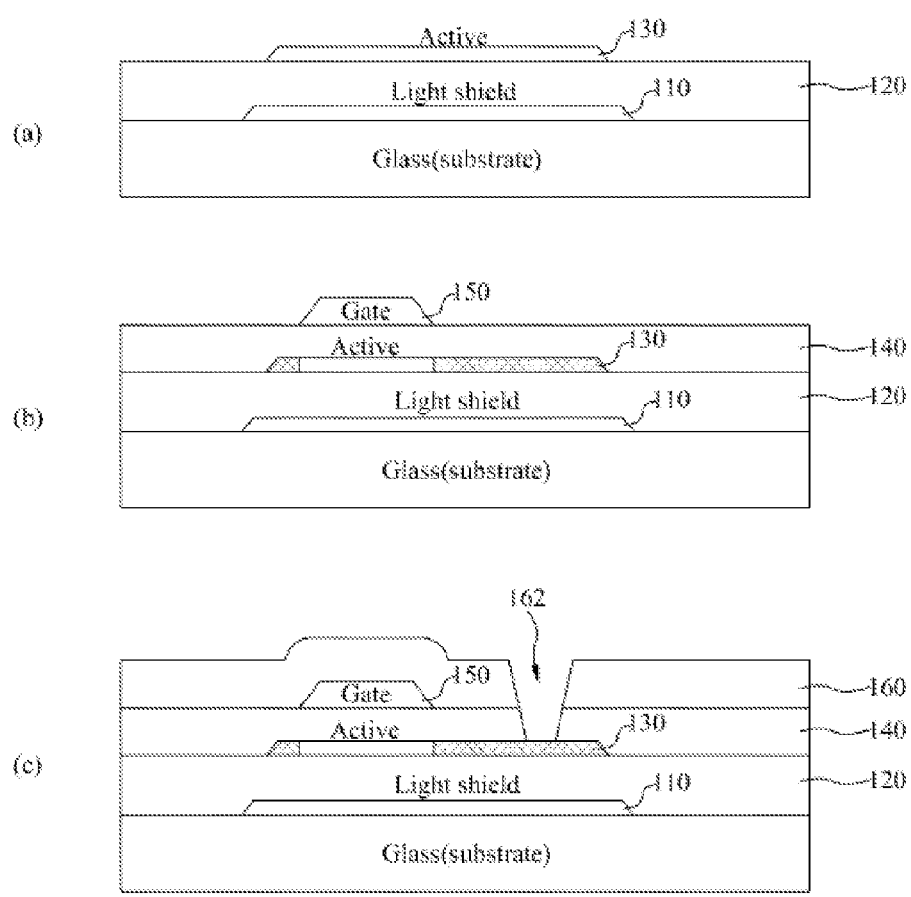
FIGS. 6A-6C illustrate a method for manufacturing an LCD device with a built-in touch screen according to the first embodiment of the present invention.
Figure 7:
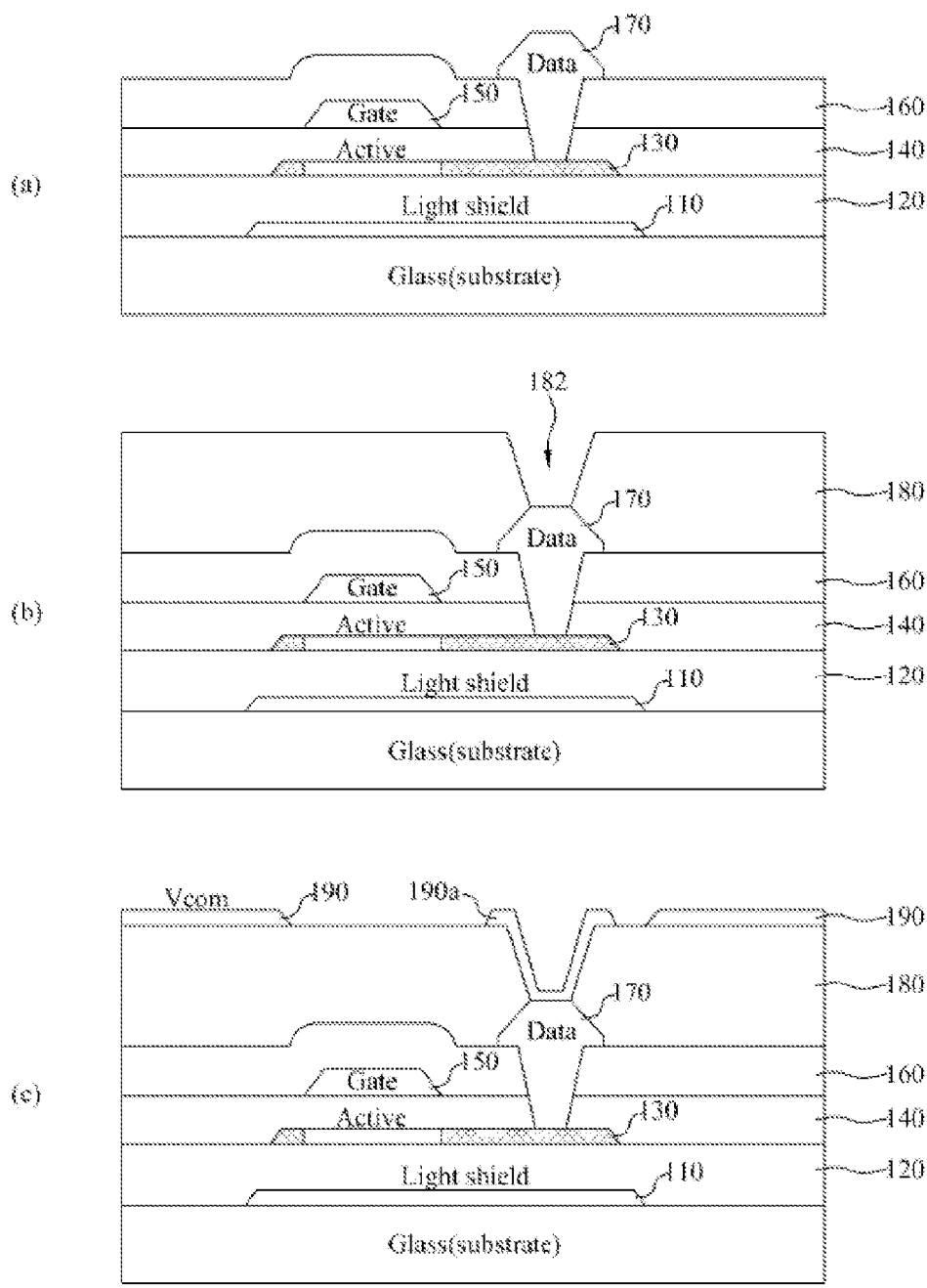
FIGS. 7A-7C illustrate a method for manufacturing an LCD device with a built-in touch screen according to the first embodiment of the present invention.
Figure 8:
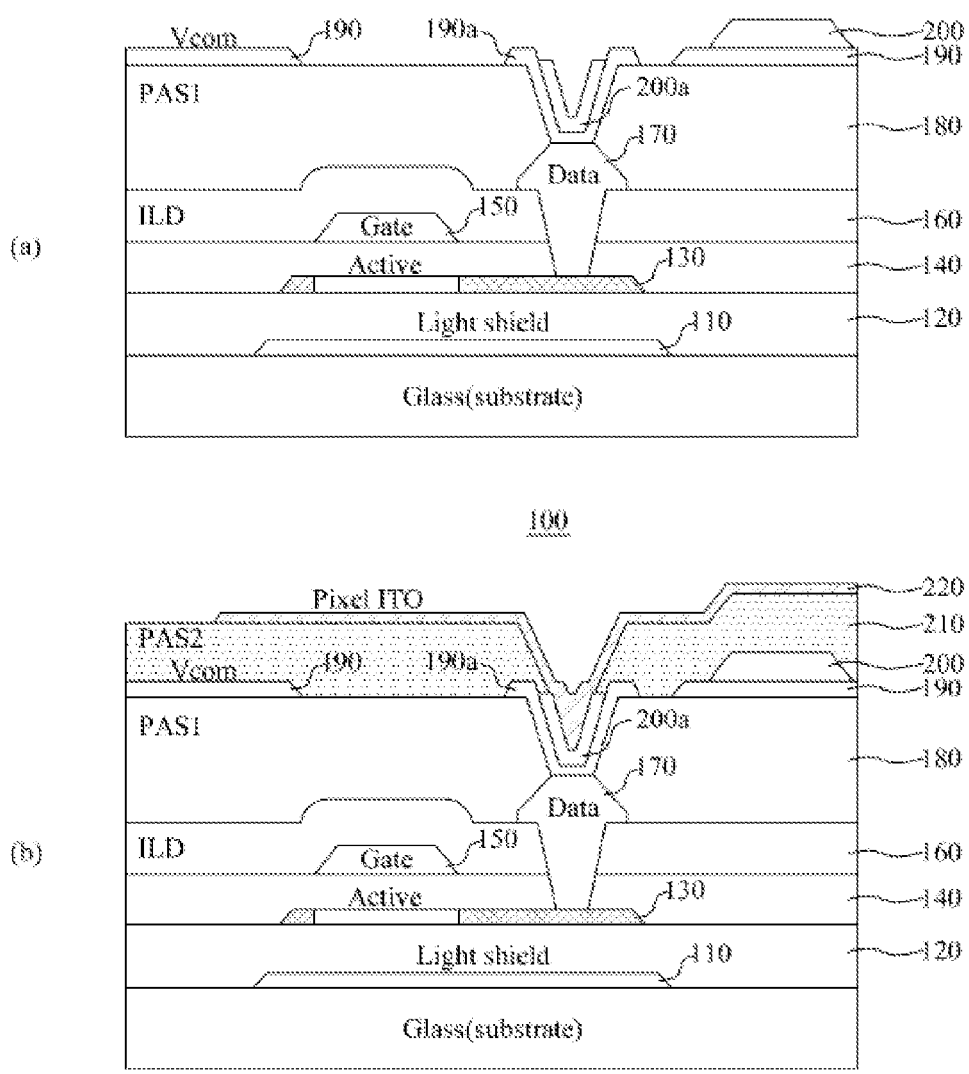
FIGS. 8A-8B illustrate a method for manufacturing an LCD device with a built-in touch screen according to the first embodiment of the present invention.

FIG. 4 illustrates a lower substrate in an LCD device with a built-in touch screen according to the first embodiment of the present invention.

Referring to FIG. 4, plural pixels are formed on the lower substrate 100. Each pixel includes a thin film transistor (TFT); a pixel electrode 220; a common electrode 190; a first conductive layer 190a; a conductive line 200 for connection of the common electrodes 190 of the neighboring pixels; and a second conductive layer 200a.

At this time, the conductive line 200 functions as a contact line which makes the common electrode 190 driven as a touch-sensing electrode to detect a user's touch point.

In more detail, each pixel of the lower substrate 100 includes a light-shielding layer 110 on a glass substrate; a buffer layer 120 on the light-shielding layer 110; an active layer (semiconductor layer) 130 on the buffer layer 120; a gate insulating layer (GI) 140 on the active layer 130; and a gate electrode 150 partially overlapped with the active layer 130 and formed of metal on the gate insulating layer 140.

There are an interlayer dielectric (ILD) 160 and a data electrode 170. The interlayer dielectric 160 insulates the gate electrode 150 from the data electrode 170. The data electrode 170 is electrically connected with the active layer 130 partially exposed via a trench.

The trench is formed by etching predetermined portions of the gate insulating layer 140 and the interlayer dielectric 160, whereby the trench exposes the predetermined portion of the active layer 130. The data electrode 170 is formed by burying a metal material in the trench. The data electrode 170 is electrically connected with the pixel electrode 220 via the first and second conductive layers 190a and 200a.

In each pixel of the lower substrate 100, there are a first passivation layer (PAS1) 180, the common electrode 190, the first and second conductive layers 190a and 200a, and the conductive line 200. The first passivation layer (PAS1) 180 is formed to cover the gate electrode 150 and the data electrode 170. The common electrode 190 is formed on an upper portion of the first passivation layer 180, and the first conductive layer 190a is brought into contact with the data electrode 170, wherein the common electrode 190 and the first conductive layer 190a are formed of a transparent conductive material such as Indium-Tin-Oxide (ITO), respectively. The conductive line 200 is formed on a predetermined portion of the common electrode 190, and is electrically connected with the common electrode 190. The second conductive layer 200a is formed on and electrically connected to the first conductive layer 190a.

A first contact hole is formed by partially etching the first passivation layer 180 to expose an upper portion of the data electrode 170. Then, the first and second conductive layers 190a and 200a are sequentially formed inside the first contact hole. Thus, the data electrode 170, the first conductive layer 190a, and the second conductive layer 200a are electrically connected in the first contact hole.

In each pixel of the lower substrate 100, there are a second passivation layer (PAS2) 210 to cover the common electrode 190, the first passivation layer 180, and the conductive line 200; and the pixel electrode 220 on the upper portion of the second passivation layer 210 is electrically connected with the data electrode 170, wherein the pixel electrode 220 is formed of a transparent conductive material such as ITO. The second passivation layer 210 and the pixel electrode 220 are formed by a single mask process using a half-tone mask (HTM).

A second contact hole is formed by partially etching the second passivation layer 210 to expose the second conductive layer 200a electrically connected with the data electrode 170 via the first conductive layer 190a. Then, the pixel electrode 220 is formed inside the second contact hole, as well as on the second passivation layer 210, whereby the pixel electrode 220 is electrically connected with the second conductive layer 200a. Thus, the pixel electrode 220 is electrically connected with the data electrode 170 via the first and second conductive layers 190a and 200a.

In the LCD device with a built-in touch screen according to the first embodiment of the present invention, during a display period of a frame, an image corresponding to a video signal is displayed by controlling transmittance of light passing through the liquid crystal layer of each pixel.

During a non-display period of a frame, the common electrode 190 formed in each pixel and connected by the conductive line 200 is driven as the touch-sensing electrode, to thereby detect the change of capacitance (Ctc) depending on the user's touch.

For this, the common electrode 190 supplies the common voltage (Vcom) to the pixel during a display period of a frame, and the common electrode 190 is driven as the touch-sensing electrode to detect the user's touch during a non-display period of a frame.

Depending on the user's touch, the touch capacitance (Ctc) is formed between the upper substrate and the common electrode 190 of the lower substrate. The touch point (TS) is detected by comparing the touch capacitance (Ctc) depending on the user's touch with a reference capacitance.

The second passivation layer (PAS2) 210 and the pixel electrode 220 are formed at the same time by a single mask process using a half-tone mask. The pixel electrode 220 is electrically connected with the data electrode 170 via the first and second conductive layers 190a and 200a sequentially formed inside the first contact hole. Accordingly, a sufficient contact area between the data electrode 170 and the pixel electrode 220 can be ensured to thereby enhance contact efficiency between the data electrode 170 and the pixel electrode 220. Also, the driving efficiency can be improved in the LCD device with a built-in touch screen according to the present invention.

The first passivation layer (PAS0), which has been formed in the interlayer dielectric of the related art, is omitted in this embodiment of the present invention. Also, the second passivation layer (PAS2) 210 and the pixel electrode 220 are formed at the same time by using one half-tone mask, to thereby ensure the align margin for the following process. Furthermore, it is possible to reduce contact failures caused by foreign matters during a manufacturing process for the contact between the data electrode 170 and the pixel electrode 220.

A method for manufacturing the LCD device with a built-in touch screen according to the first embodiment of the present invention will be described with reference to FIGS. 5 to 9.

As shown in FIG. 5, the second passivation layer (PAS2) 210 and the pixel electrode 220 may be simultaneously formed on the lower substrate 100 by a mask process using a half-tone mask. Thus, in comparison to the related art, the number of masks used for the manufacturing process is reduced, whereby the accompanying processes are decreased.

As shown in FIG. 6A, a light-shielding material such as a metal material is formed on a substrate.

Then, the light-shielding material is patterned by photolithography and wet-etching processes using a mask, to thereby form the light-shielding layer 110. The light-shielding layer 110 is aligned with the active layer 130 to be formed by the following process.

The substrate may be formed of transparent glass or transparent plastic. FIGS. 6A-6C show an exemplary case using the glass substrate.

After that, the buffer layer 120 is formed to cover the light-shielding layer 110, and amorphous silicon (a-Si) is deposited on the buffer layer 120, to thereby form the semiconductor layer.

Then, the semiconductor layer is patterned by photolithograph and dry-etching process using a mask, to thereby form the active layer 130. The active layer 130 is formed in such a manner that it is aligned with the light-shielding layer 110.

As shown in FIG. 6B, TEOS (Tetra Ethyl Ortho Silicate) or MTO (Middle Temperature Oxide) may be deposited on an entire surface of the substrate by CVD (Chemical Vapor Deposition), thereby forming the gate insulating layer 140.

Then, a metal material is deposited on the gate insulating layer 140 while being overlapped with the active layer 130. Then, the gate electrode 150 is formed by photolithography and etching process using a mask, and the gate electrode 150 is lightly doped with N-type dopant (N).

When forming the gate electrode 150, the wet-etching and dry-etching processes are carried out. Between the wet-etching process and the dry-etching process, the active layer 130 is heavily doped with N-type dopant ($N^+$).

As the gate electrode 150 is formed on the active layer 130, the predetermined region of the active layer 130, which is not overlapped with the gate electrode 150, is heavily doped with N-type dopant ($N^+$).

As shown in FIG. 6C, an insulating material is deposited on the substrate, whereby the gate electrode 150 and the gate insulating layer 140 are covered with the insulating material, which forms the interlayer dielectric 160 to insulate the gate electrode 150 with the other elements of the lower substrate.

Then, photolithography and dry-etching processes using a mask is applied to the predetermined portion of the interlayer dielectric 160 and the predetermined portion of the gate insulating layer 140, to thereby form the trench 162 exposing the upper portion of the active layer 130.

As shown in FIG. 7A, a metal material is deposited on the entire surface of the substrate and inside the trench 162 (wherein, the metal material is buried in the trench 162). After that, the data electrode 170 is formed by photolithograph and wet-etching processes using a mask.

Inside the trench 162, the data electrode 170 is electrically connected with the active layer 130.

As shown in FIG. 7B, the first passivation layer (PAS1) 180 is formed to cover the interlayer dielectric 160 and the data electrode 170. Then, the first contact hole 182 for exposing the data electrode 170 is formed by photolithography and etching process using a mask.

As shown in FIG. 7C, a transparent conductive material is deposited on the first passivation layer (PAS1) 180 and inside the first contact hole 182.

Then, the common electrode 190 and first conductive layer 190a are formed on the predetermined portion of the first passivation layer (PAS1) 180 and inside the first contact hole 182 respectively by photolithography and etching process using a mask.

As shown in FIG. 8A, a conductive metal material is deposited on the first passivation layer (PAS1) 180, the first conductive layer 190a, and the common electrode 190, to thereby form a conductive film.

Then, photolithography and etching process using a mask is applied to the conductive layer, whereby the conductive line 200 and second conductive layer 200a are formed on the predetermined portion of the first passivation layer (PAS1) 180 and inside the first contact hole 182, respectively.

In this case, the common electrode 190 is electrically connected with the conductive line 200. During a display period of a frame, the common voltage (Vcom) is supplied to the common electrode 190 formed on the first passivation layer (PAS1) 180.

Meanwhile, the first conductive layer 190a formed inside the first contact hole 182 serves as the contact electrode to electrically connect the data electrode 170 with the pixel electrode 220.

As shown in FIG. 8B, the second passivation layer (PAS2) 210 is formed to cover the common electrode 190, the second conductive layer 200a, and the conductive line 200. After that, photolithography, etching, and ashing processes using a half-tone mask is applied to the second passivation layer (PAS2) 210, thereby forming the second contact hole 212 obtained by partially etching the second passivation layer (PAS2) 210.

As shown in FIGS. 9A-9C, the second contact hole 212 is formed in the region corresponding to the data electrode 170. The second conductive layer 200a electrically connected with the data electrode 170 is exposed via the second contact hole 212.

After that, as shown in FIG. 9D, the pixel electrode 220 is formed on the second passivation layer (PAS2) 210 and inside the second contact hole 212, wherein the pixel electrode 220 is formed of the transparent conductive material such as ITO. That is, the second passivation layer (PAS2) 210 and the pixel electrode 220 may be simultaneously formed by a single mask process using a half-tone mask.

Inside the second contact hole 212, the pixel electrode 220 is electrically connected with the second conductive layer 200a, whereby the data electrode 170 is electrically connected with the pixel electrode 220 via the first and second conductive layers 190a and 200a formed inside the first contact hole 182.

Figure 9:
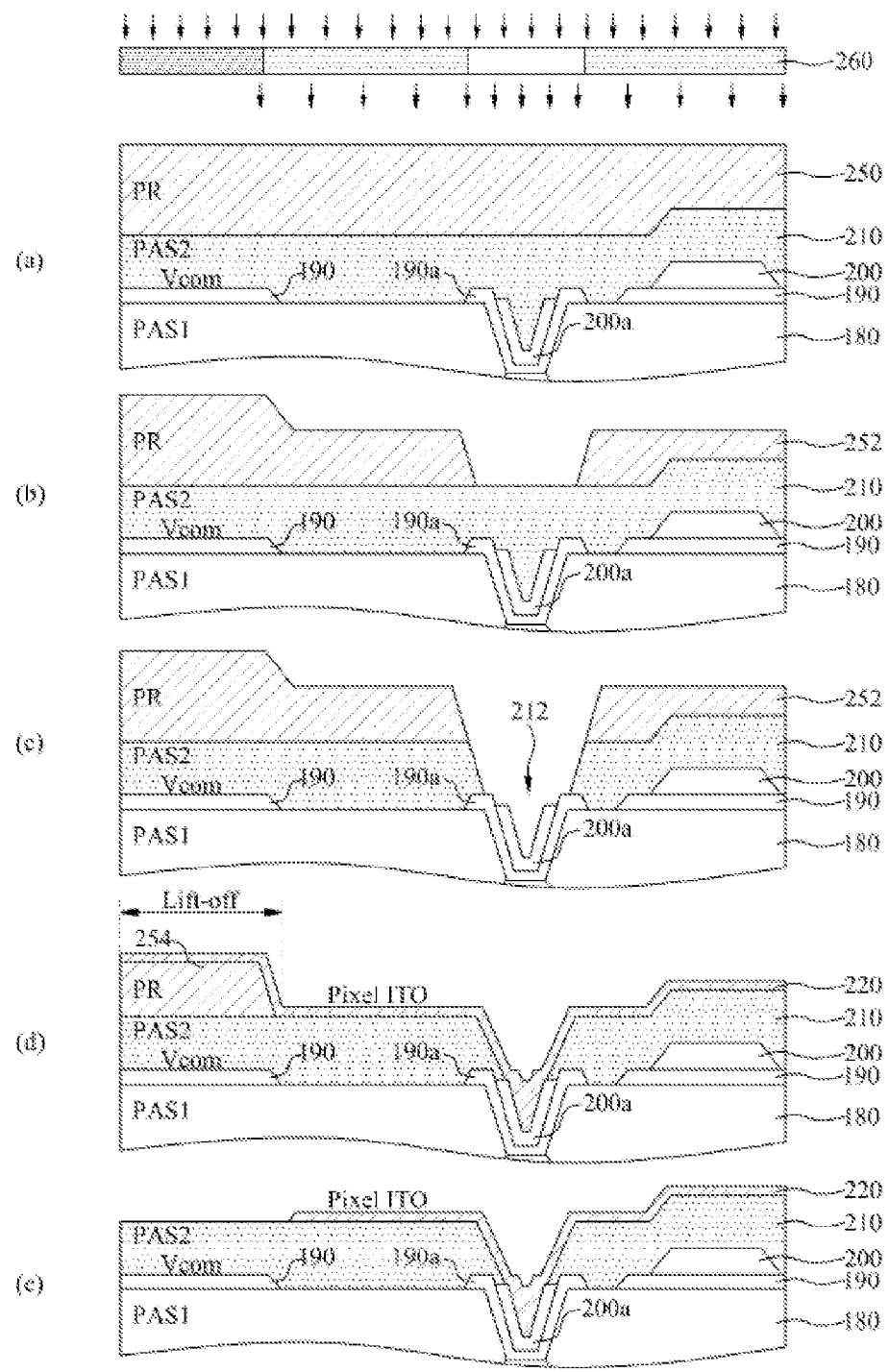
FIGS. 9A-9E illustrate a method for manufacturing an LCD device with a built-in touch screen according to the first embodiment of the present invention.

A detailed method for forming the second passivation layer (PAS2) 210 and the pixel electrode 220 by the use of half-tone mask will be explained with reference to FIG. 9.

As shown in FIG. 9A, the second passivation layer (PAS2) 210 is formed to cover the common electrode 190 and the conductive line 200.

After that, a photoresist layer 250 (hereinafter, referred to as 'PR layer') is formed by coating photoresist, and more particularly, photoacryl onto the second passivation layer (PAS2) 210.

Then, a plurality of photoresist patterns 252 (hereinafter, referred to as 'PR pattern') having an uneven pattern ( |⊓⊓⊓ ) is formed by photolithography using the half-tone mask (HTM) 260, as shown in FIG. 9B.

That is, the PR layer 250 is irradiated with the light by the use of half-tone mask 260, to thereby form the plurality of PR patterns 252 used as the mask for forming the second contact hole 212 and the pixel electrode 220.

The half-tone mask 260 includes a non-transmission region through which light is not transmitted; a semi-transmission region through which light is partially transmitted; and a transmission region through which light is transmitted. Thus, since the PR layer 250 is patterned by the use of half-tone mask 260, it enables to form the plural PR patterns 252 with the different widths and thicknesses.

If using the half-tone mask 260, the PR layer 250 corresponding to the non-transmission region remains as it is; the PR layer 250 corresponding to the semi-transmission region remains partially; and the PR layer 250 corresponding to the transmission region is removed completely to thereby expose the predetermined portion of the second passivation layer (PAS2) 210.

As shown in FIG. 9C, the exposed region of the second passivation layer (PAS2) 210 is dry-etched by using the plurality of PR patterns 252, to thereby form the second contact hole 212. At this time, the second conductive layer 200a formed in the first contact hole 182 is exposed via the second contact hole 212.

As shown in FIG. 9D, the PR pattern 252 is ashed in such a way that the PR pattern 252 remains only on the predetermined portion of the second passivation layer (PAS2) 210, and more particularly, only above the gate electrode.

Then, an ITO (Indium-Tin-Oxide) material is deposited on the second passivation layer (PAS2) 210 and the PR pattern 254 remaining after the ashing process.

As shown in FIG. 9E, the PR pattern 254 remaining on the gate electrode 170 is lifted-off to complete the formation of the pixel electrode 220.

As explained with reference to FIGS. 9A-9E, the second passivation layer (PAS2) 210 and the pixel electrode 220 may be simultaneously formed by a mask process using a half-tone mask.

The number of masks used in the above method for manufacturing the LCD device with a built-in touch screen according to the first embodiment of the present invention is smaller than the number of masks used in the related art method by one mask. In comparison to the related art method, the detailed processes in the above method for manufacturing the LCD device with a built-in touch screen according to the first embodiment of the present invention may be decreased by 12.2% (while the related art method requires 155 steps, the method of the present invention requires 136 steps), whereby the method for manufacturing the LCD device with a built-in touch screen according to the first embodiment of the present invention enables the reduced manufacturing cost and improved manufacturing efficiency.

Also, the second passivation layer (PAS2) 210 and the pixel electrode 220 are formed at the same time by using a half-tone mask, thereby ensuring the align margin for the manufacturing process.

The improved contact efficiency between the data electrode and the pixel electrode on the lower substrate enhances the driving efficiency.

Also, the lower substrate is formed of low-temperature poly silicon (LTPS), thereby enhancing the driving efficiency.

Hereinafter, an LCD device with a built-in touch screen according to the second embodiment of the present invention will be described with reference to FIG. 10.

Figures 10, 11:
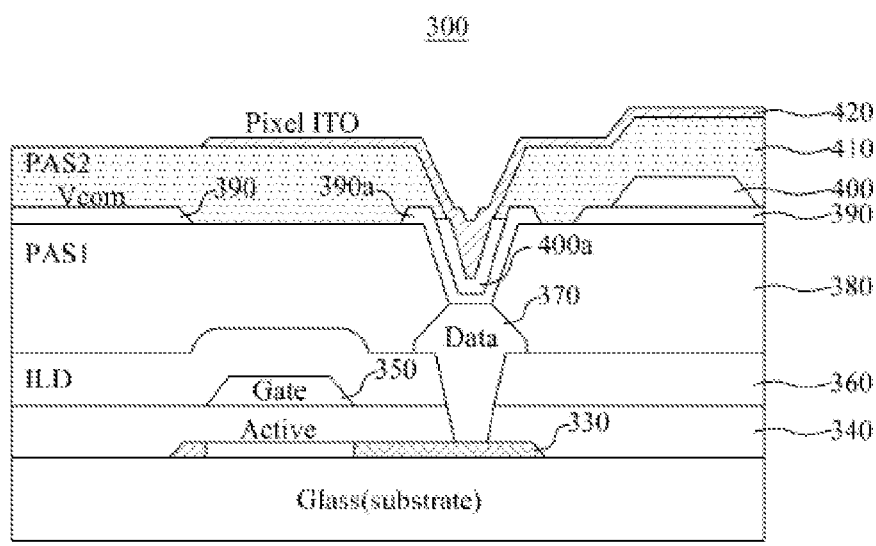
FIG. 10 illustrates a lower substrate in an LCD device with a built-in touch screen according to the second embodiment of the present invention.
FIG. 11 illustrates a method for manufacturing an LCD device with a built-in touch screen according to the second embodiment of the present invention.
Figure 12:
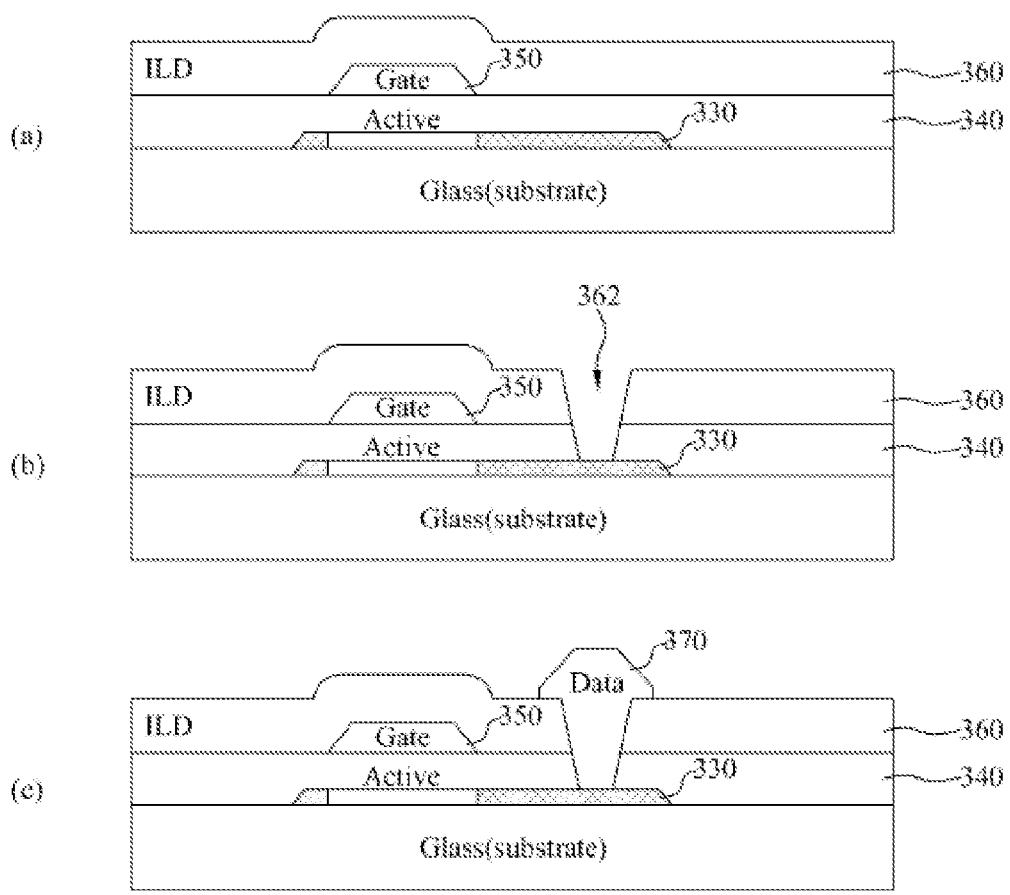
FIGS. 12A-12C illustrate a method for manufacturing an LCD device with a built-in touch screen according to the second embodiment of the present invention.
Figure 13:
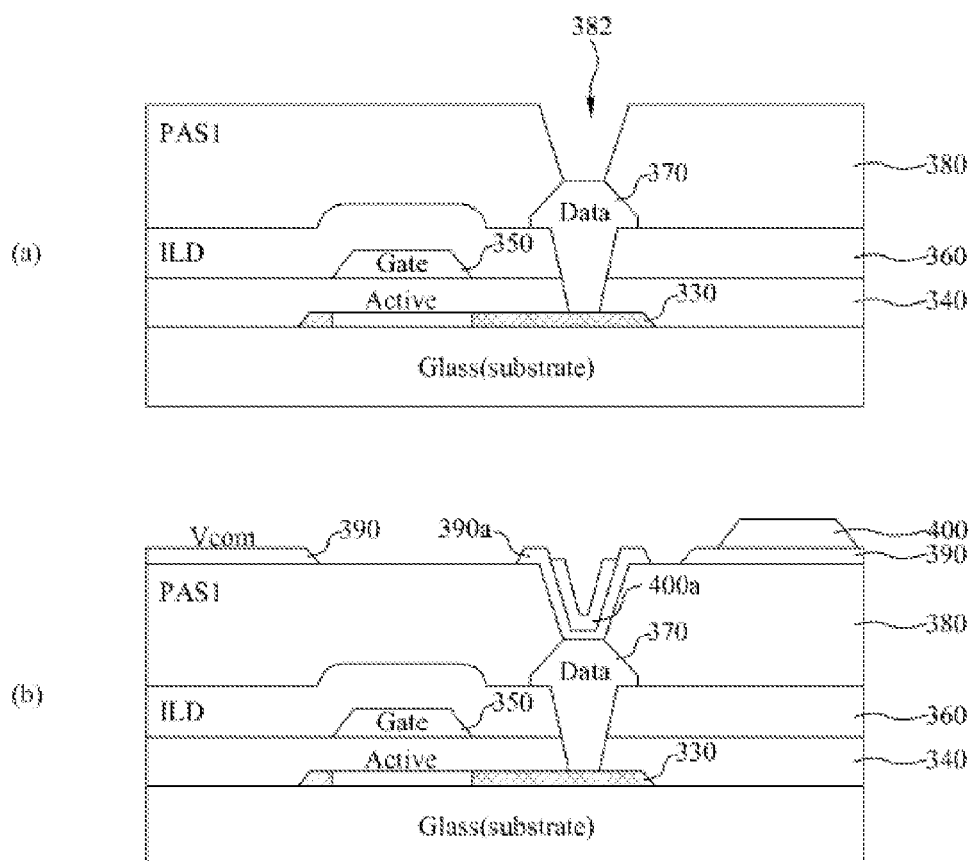
FIGS. 13A-13B illustrate a method for manufacturing an LCD device with a built-in touch screen according to the second embodiment of the present invention.

FIG. 10 illustrates a lower substrate in an LCD device with a built-in touch screen according to the second embodiment of the present invention. On explanation of a lower substrate 300 in the LCD device with a built-in touch screen according to the second embodiment of the present invention, a detailed explanation for the same parts as those of the first embodiment shown in FIG. 4 will be omitted.

Referring to FIG. 10, plural pixels are formed on a lower substrate 300.

The plural pixels include a thin film transistor (TFT), a pixel electrode 420, a common electrode 390, a first conductive layer 390a, a conductive line 400, and a second conductive layer 400a.

The conductive line 400 functions as a contact line which makes the common electrode 390 driven as a touch-sensing electrode to detect a user's touch point.

In more detail, each pixel of the lower substrate 300 includes an active layer (semiconductor layer) 330, a gate insulating layer (GI) 340, a gate electrode 350, an interlayer dielectric (ILD) 360, and a data electrode 370.

A trench is formed by partially etching the gate insulating layer 340 and the interlayer dielectric 360. A predetermined portion of the active layer 330 is exposed via the trench, and the data electrode 370 is formed by burying a metal material in the trench. The data electrode 370 is electrically connected with the pixel electrode 420 via the first and second conductive layers 390a and 400a.

Each pixel of the lower substrate 300 includes a first passivation layer (PAS1) 380 to cover the data electrode 370; the common electrode 390; the first and second conductive layers 390a and 400a; and the conductive line 400.

The common electrode 390, the first and second conductive layers 390a and 400a, and the conductive line 400 are formed at the same time by a mask process using a half-tone mask (HTM).

A first contact hole is formed by partially etching the first passivation layer 380. Then, the first and second conductive layers 390a and 400a are sequentially formed inside the first contact hole, whereby the data electrode 370, first conductive layer 390a, and second conductive layer 400a are electrically connected inside the first contact hole.

Each pixel of the lower substrate 300 includes a second passivation layer (PAS2) 410; and the pixel electrode 420 on an upper portion of the second passivation layer 410 is electrically connected with the data electrode 470 via the first and second conductive layers 390a and 400a.

The second passivation layer 410 and the pixel electrode 420 are formed at the same time by a mask process using a half-tone mask (HTM).

A second contact hole is formed by partially etching the second passivation layer 410. Thus, the second conductive layer 400a electrically connected with the data electrode 370 via the first conductive layer 390a is exposed via the second contact hole. The pixel electrode 420 is formed inside the second contact hole, and is then electrically connected with the second conductive layer 400a.

Accordingly, the pixel electrode 420 is electrically connected with the data line 370 via the first and second conductive layers 390a and 400a.

During a display period of a frame, the common electrode 390 supplies the common voltage (Vcom) to the pixel. Meanwhile, during a non-display period of a frame, the common electrode 390 is driven as the touch-sensing electrode to detect the user's touch.

As mentioned above, in the LCD device with a built-in touch screen according to the second embodiment of the present invention, the first and second conductive layers 390a and 400a are simultaneously formed inside the first contact hole by a single mask process using a half-tone mask.

The data electrode 390 is electrically connected with the pixel electrode 420 via the first and second conductive layers 390a and 400a.

Accordingly, a sufficient contact area between the data electrode 370 and the pixel electrode 420 can be ensured to thereby enhance contact efficiency between the data electrode 370 and the pixel electrode 420. Also, the driving efficiency can be improved in the LCD device with a built-in touch screen according to the second embodiment of the present invention.

Also, the light-shielding layer and the passivation layer (PAS0), which are formed in the interlayer dielectric of the related art, are omitted in the second embodiment of the present invention. In addition, the second passivation layer (PAS2) 410 and the pixel electrode 420 are formed at the same time by a mask process using a half-tone mask. Thus, it is possible to ensure a sufficient align margin, and to reduce contact failures caused by foreign matters during a manufacturing process for the contact between the data electrode 370 and the pixel electrode 420.

A method for manufacturing the LCD device with a built-in touch screen according to the second embodiment of the present invention will be described with reference to FIGS. 11 to 16.

FIGS. 11 to 16 illustrate a method for manufacturing an LCD device with a built-in touch screen according to the second embodiment of the present invention.

In the method for manufacturing the LCD device with a built-in touch screen according to the second embodiment of the present invention, as shown in FIG. 11, the common electrode 390, the first and second conductive layers 390a and 400a, and the conductive line 400 may be simultaneously formed on the lower substrate 300 by a mask process using a half-tone mask.

Also, the second passivation layer (PAS2) 210 and the pixel electrode 220 may be simultaneously formed by a mask process using a half-tone mask.

Accordingly, it is possible to reduce the number of masks used for the manufacturing method according to the second embodiment of the present invention as compared to the related art, and also to reduce the detailed processes.

Also, the light-shielding layer and the passivation layer (PAS0), which are formed in the interlayer dielectric of the related art, are omitted in the second embodiment of the present invention, to thereby reduce the detailed processes.

In more detail, as shown in FIG. 12A, amorphous silicon (a-Si) is deposited on a substrate, to thereby form the semiconductor layer. Then, the semiconductor layer is patterned by photolithography and dry-etching process using a mask, to thereby form the active layer 330.

The substrate may be formed of transparent glass or transparent plastic. FIGS. 12A-12C show an exemplary case using the glass substrate.

TEOS (Tetra Ethyl Ortho Silicate) or MTO (Middle Temperature Oxide) may be deposited on an entire surface of the substrate by CVD (Chemical Vapor Deposition), thereby forming the gate insulating layer 340.

Then, a metal material is deposited on the gate insulating layer 340 while being overlapped with the active layer 330. Then, the gate electrode 350 is formed by photolithography and etching process using a mask.

Thereafter, an insulating material is deposited on the substrate, whereby the gate electrode 150 and the gate insulating layer 140 are covered with the insulating material, which forms the interlayer dielectric (ILD) 360.

As shown in FIG. 12B, photolithography and dry-etching process using a mask is applied to the predetermined portions of the interlayer dielectric 360 and the gate insulating layer 340, to thereby form a trench 362. An upper portion of the active layer 330 is exposed via the trench 362.

As shown in FIG. 12C, a metal material is deposited on the entire surface of the substrate and inside the trench 362 (wherein, the metal material is buried in the trench 362). After that, the data electrode 370 is formed by photolithograph and wet-etching processes using a mask.

Inside the trench 362, the data electrode 370 is electrically connected with the active layer 330.

As shown in FIG. 13A, the first passivation layer (PAS1) 380 is formed to cover the interlayer dielectric 360 and the data electrode 370. Then, the first contact hole 382 is formed by photolithography and etching process using a mask.

Then, a transparent conductive material such as ITO and a metal material are sequentially deposited on the first passivation layer (PAS1) 380 and inside the first contact hole 382.

As shown in FIG. 13B, the common electrode 390 and the conductive line 400 are formed on the predetermined portion of the first passivation layer (PAS1) 380 and the first and second conductive layers 390a and 400a are formed inside the first contact hole 382, by photolithography, etching, and ashing processes using a half-tone mask (HTM). That is, the common electrode 390, the first and second conductive layers 390a and 400a, and the conductive line 400 are simultaneously formed by the use of one mask.

Figure 14:
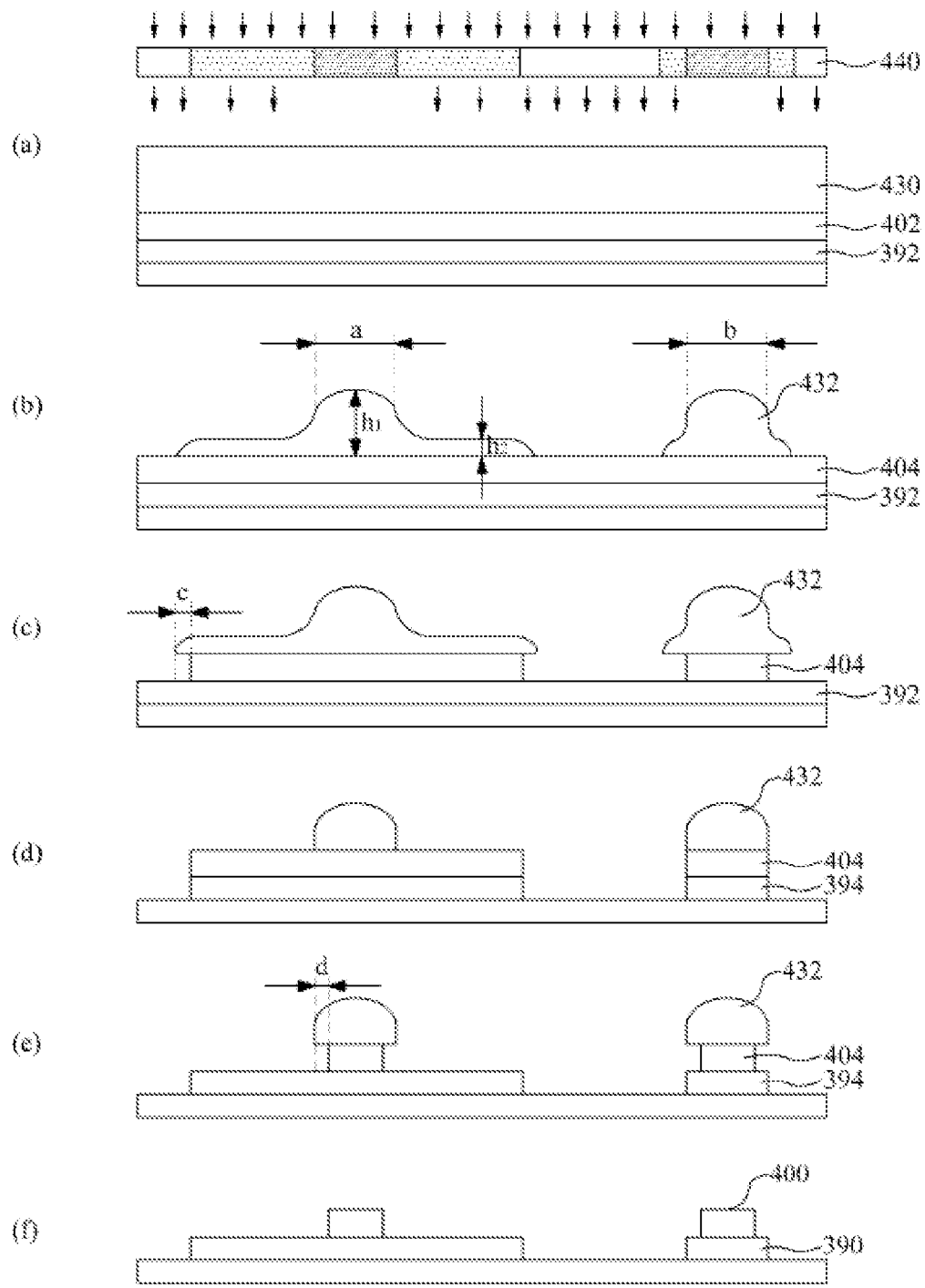
FIGS. 14A-14F illustrate a method for manufacturing an LCD device with a built-in touch screen according to the second embodiment of the present invention.
Figure 15:
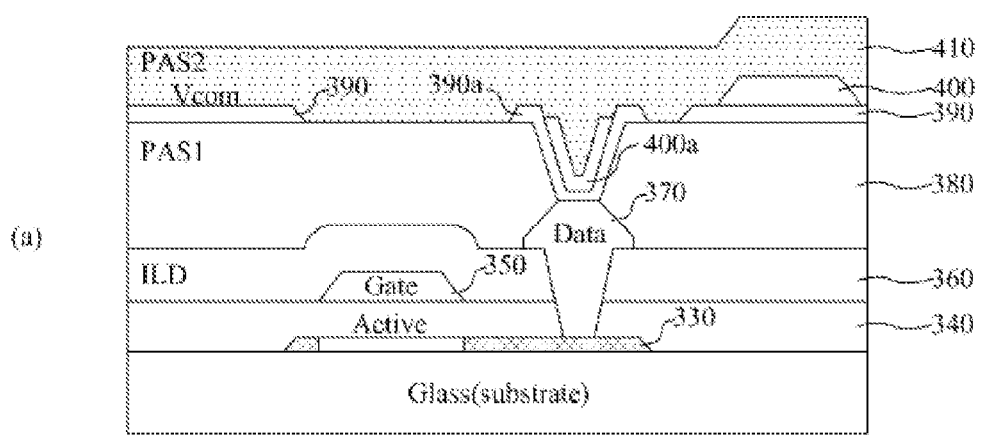
FIGS. 15A-15B illustrate a method for manufacturing an LCD device with a built-in touch screen according to the second embodiment of the present invention.
Figure 15:
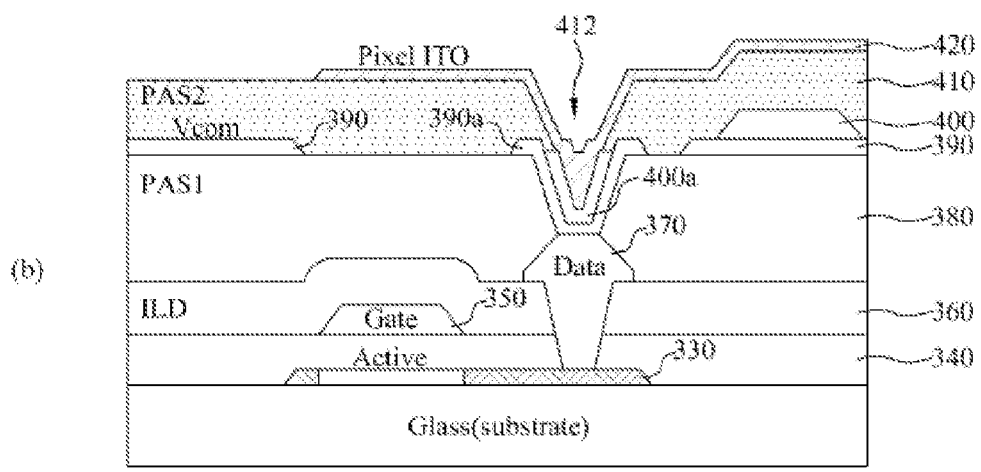
Figure 16:
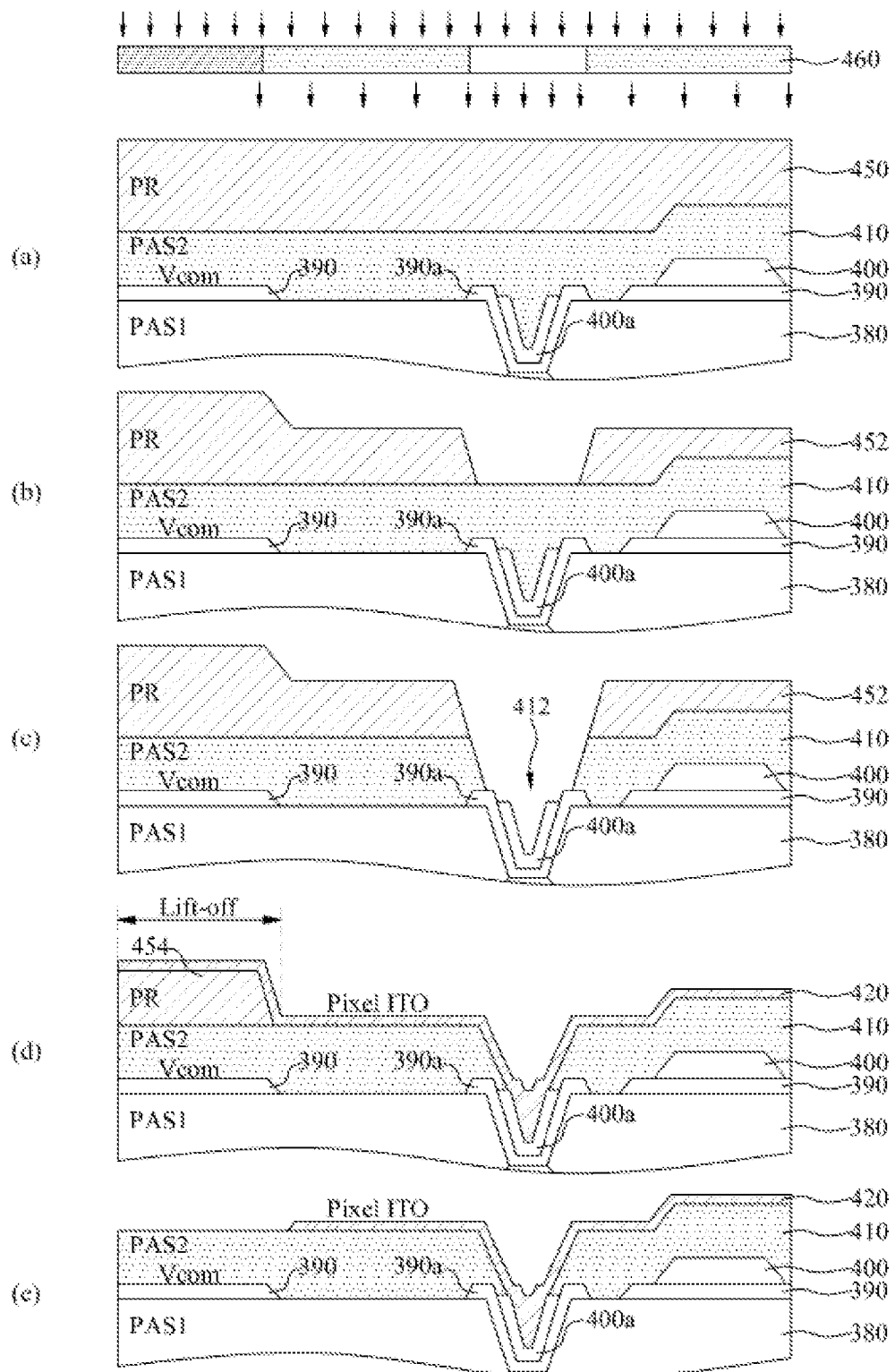
FIGS. 16A-16E illustrate a method for manufacturing an LCD device with a built-in touch screen according to the second embodiment of the presente invention.

A detailed method for forming the common electrode 390 and the conductive line 400 by the use of half-tone mask will be described with reference to FIG. 14.

As shown in FIG. 14A, ITO (Indium-Tin-Oxide) and metal materials are sequentially deposited on the first passivation layer (PAS1) 380, to thereby form an ITO layer 392 and a metal layer 402.

Then, a PR layer 430 is formed by coating photoacryl onto the metal layer 402.

A plurality of PR patterns 432 are formed on the metal layer 402 by photolithography using the half-tone mask 440. As shown in FIG. 14B, the PR pattern 432 is formed in an uneven pattern ( ).

That is, the PR layer 430 is irradiated with the light by the use of half-tone mask 440, to thereby form the plurality of PR patterns 432 used as the mask for forming the common electrode 390 and the conductive line 400.

If using the half-tone mask 440, the PR layer 430 corresponding to the non-transmission region remains as it is; the PR layer 430 corresponding to the semi-transmission region remains partially; and the PR layer 430 corresponding to the transmission region is removed completely.

For example, the plural PR patterns 432 may be formed when light of 50 mJ~100 mJ luminous exposure is applied to the PR layer 430. That is, the PR pattern of the non-transmission region has 'h1' height of 1.5~3.0 μm; and the PR pattern of the semi-transmission region has 'h2' height of 0.2~1.0 μm.

Among the plural PR patterns, a width (a) of the first PR pattern and a width (b) of the second PR pattern are designed within a range of 2~5 μm. The width (a) of the first PR pattern may be different from the width (b) of the second PR pattern. For obtaining straightness of the line, the width (a) of the first PR pattern is relatively small, and the width (b) of the second PR patter is relatively large.

As shown in FIG. 14C, the metal layer 402 is first ashed by using the plural PR patterns 432 as a mask, to thereby form a metal pattern 404.

A critical dimension 'c' of the PR pattern 432 and metal pattern 404 formed by the first etching may be not more than 0.5 μm.

As shown in FIG. 14D, after ashing the plural PR patterns 432, the ITO layer 392 is etched under the circumstance that the metal pattern 404 is used as the mask, to thereby form an ITO pattern 494. At this time, when etching the ITO layer 392, an organic film may be damaged by plasma, that is, photoacryl may be damaged by plasma. Thus, when the liquid crystal panel is driven, stains might occur due to the damaged photoacryl. To prevent the stains, the ashing process of the PR pattern 432 may be carried out before the etching process of the ITO layer 392.

As shown in FIG. 14E, the metal pattern 404 formed by the first etching of the metal layer 402 is secondly etched under the circumstance that the PR pattern remaining after the ashing process of the PR pattern 432 is used as the mask. A critical dimension 'c' of the PR pattern 432 and metal pattern 404 formed by the second etching may be not more than 0.5 μm.

As shown in FIG. 14F, the common electrode 390 of the ITO is formed by ashing the PR pattern 432 remaining on the substrate, and the conductive line 400 is formed of the metal material.

As shown in FIG. 13B, the common electrode 390 and the conductive line 400 are simultaneously formed on the first passivation layer (PAS1) 380 and, at the same time, the first and second conductive layers 390a and 400a are formed inside the first contact hole 382 so as to be electrically connected to the data electrode 370.

Referring to FIGS. 14A-14F, the common electrode 390 and the conductive line 400 are simultaneously formed by a mask process using a half-tone mask.

As shown in FIG. 15A, the second passivation layer (PAS2) 410 is formed on the first passivation layer (PAS1) 380, to thereby cover the common electrode 390, the first and second conductive layers 390a and 400a, and the conductive line 400.

As shown in FIG. 15B, the second contact hole 412 is formed in the predetermined portion of the second passivation layer (PAS2) 410 by the photolithography, etching, and ashing processes using the half-tone mask (HTM). At this time, the second contact hole 412 is formed in the region corresponding to the data electrode 370, wherein the second contact hole 412 exposes the second conductive layer 400a electrically connected with the data electrode 370 via the first conductive layer 390a.

The pixel electrode 420 of the transparent conductive material such as ITO is formed on the second passivation layer (PAS2) 410 and is also formed inside the second contact hole 412. That is, the second passivation layer (PAS2) and the pixel electrode 420 may be simultaneously formed by a mask process using a half-tone mask.

Inside the second contact hole 412, the pixel electrode 420 is electrically connected with the second conductive layer 400a. Thus, the data electrode 370 is electrically connected with the pixel electrode 420 via the first and second conductive layers 390a and 400a formed inside the first contact hole 382.

A detailed method for forming the second passivation layer (PAS2) 410 and the pixel electrode 420 by the use of half-tone mask will be described with reference to FIGS. 16A-16E.

As shown in FIG. 16A, the second passivation layer (PAS2) 410 is formed to cover the common electrode 390, the first and second conductive layers 390a and 400a, and the conductive line 400.

After that, a photoresist layer 450 is formed by coating photoacryl onto the second passivation layer (PAS2) 410.

Then, a plurality of photoresist patterns 452 having an uneven pattern ( ) is formed by photolithography and etching process using the half-tone mask (HTM) 460, as shown in FIG. 16B.

That is, the PR layer 450 is irradiated with the light by the use of half-tone mask 460, to thereby form the plurality of PR patterns 452 used as the mask for forming the second contact hole 412 and the pixel electrode 420.

As the PR layer 450 is patterned by the use of half-tone mask 460, it enables the formation of the plural PR patterns 452 with the different widths and thicknesses.

If using the half-tone mask 460, the PR layer 430 corresponding to the non-transmission region remains as it is; the PR layer 430 corresponding to the semi-transmission region remains partially; and the PR layer 430 corresponding to the transmission region is removed completely to thereby expose the predetermined portion of the second passivation layer (PAS2) 410.

As shown in FIG. 16C, the exposed region of the second passivation layer (PAS2) 410 is dry-etched by using the plurality of PR patterns 452 as a mask, to thereby form the second contact hole 412. At this time, the second conductive layer 400a formed in the first contact hole 382 is exposed via the second contact hole 412.

As shown in FIG. 16D, the PR pattern 452 is ashed in such a way that the PR pattern 452 remains only on the predetermined portion of the second passivation layer (PAS2) 410, and more particularly, only above the gate electrode.

Then, an ITO (Indium-Tin-Oxide) material is deposited on the second passivation layer (PAS2) 410 and the PR pattern 454 remaining after the ashing process.

As shown in FIG. 16E, the PR pattern 454 remaining on the gate electrode 370 is lifted-off to complete the formation of the pixel electrode 420.

As explained with reference to FIG. 16A-16E, the second passivation layer (PAS2) 410 and the pixel electrode 420 may be simultaneously formed by a mask process using a half-tone mask.

Also, the second passivation layer (PAS2) 410 and the pixel electrode 420 are formed at the same time by using a half-tone mask, thereby ensuring the align margin for the manufacturing process.

For the above explanation, the active layer is doped with N-type dopant, but not necessarily. According to another embodiment of the present invention, the active layer may be doped with P-type dopant.

The number of masks used in the above method for manufacturing the LCD device with a built-in touch screen according to the second embodiment of the present invention is smaller that the number of masks used in the related art method by three masks. In comparison to the related art method, the detailed processes in the above method for manufacturing the LCD device with a built-in touch screen according to the second embodiment of the present invention may be decreased by 28% (while the related art method requires 155 steps, the method of the present invention requires 113 steps).

That is, the lower substrate according to the second embodiment of the present invention may be manufactured with 7 masks, whereby the method for manufacturing the LCD device with a built-in touch screen according to the second embodiment of the present invention enables the reduced manufacturing cost and improved manufacturing efficiency.

The improved contact efficiency between the data electrode and the pixel electrode on the lower substrate enables to enhance the driving efficiency.

Also, the lower substrate is formed of low-temperature poly silicon (LTPS), thereby enhancing the driving efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device with a built-in touch screen comprising:
a substrate having a pixel region;
a thin film transistor in the pixel region;
a first passivation layer on the thin film transistor, the first passivation layer including a first contact hole;
a common electrode on at least one portion of the first passivation layer, the common electrode formed of a first material and operable to sense touch;
a first conductive layer inside the first contact hole so as to be electrically connected to a data electrode of the thin film transistor;
a conductive line on at least one portion of the first passivation layer and electrically connected to the common electrode, the conductive line formed of a second material;
a second conductive layer on the first conductive layer;
a second passivation layer on the common electrode, the first passivation layer, and the conductive line, the second passivation layer including a second contact hole; and
a pixel electrode on the second passivation layer, the second conductive layer between the pixel electrode and the first conductive layer, the pixel electrode electrically connected to the second conductive layer through the second contact hole such that the pixel electrode is electrically connected to the data electrode via the first and second conductive layers,
wherein the first and second materials are different from each other,
wherein the first conductive layer includes a same material as the first material and the second conductive layer includes a same material as the second material, and
wherein the pixel electrode and the second conductive layer are formed of different types of materials.

2. The liquid crystal display device according to claim 1, wherein the common electrode and the conductive line are formed by a mask process using a half-tone mask.

3. The liquid crystal display device according to claim 1, wherein the thin film transistor is formed of low-temperature poly silicon (LTPS).

4. The liquid crystal display device according to claim 1, wherein the conductive line connects common electrodes of neighboring pixel regions.

5. The liquid crystal display device according to claim 1, wherein the common electrode senses touch during a non-display period and supplies a common voltage during a display period of the liquid crystal display device.

6. The liquid crystal display device according to claim 1, wherein the first contact hole is formed by etching a predetermined portion of the first passivation layer.

7. The liquid crystal display device according to claim 1, wherein the second contact hole is formed by etching a predetermined portion of the second passivation layer.

8. The liquid crystal display device according to claim 1, wherein the first material is a transparent conductive material, the second material is a conductive metal, and the pixel electrode is formed of the transparent conductive material.

9. The liquid crystal display device according to claim 1, wherein the common electrode is directly on the first passivation layer, and the conductive line is directly on the common electrode, wherein the conductive line connects neighboring common electrodes.

* * * * *